United States Patent
Chan et al.

(10) Patent No.: US 10,354,255 B2
(45) Date of Patent: Jul. 16, 2019

(54) CLIENT ACCESS LICENSE TRACKING MECHANISM

(75) Inventors: Ming Chan, Redmond, WA (US); Mark Sterin, Redmond, WA (US); Jagadeesh Kalki, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1132 days.

(21) Appl. No.: 11/971,899

(22) Filed: Jan. 9, 2008

(65) Prior Publication Data

US 2009/0177698 A1    Jul. 9, 2009

(51) Int. Cl.
G06F 16/30 (2019.01)
G06Q 30/00 (2012.01)
G06F 21/10 (2013.01)

(52) U.S. Cl.
CPC ........... *G06Q 30/00* (2013.01); *G06F 21/105* (2013.01)

(58) Field of Classification Search
CPC ....................................................... G06F 17/30
USPC ........................................................ 707/200
See application file for complete search history.

(56) References Cited

U.S. PATENT DOCUMENTS

| | | | |
|---|---|---|---|
| 5,790,664 A | 8/1998 | Coley et al. | |
| 6,018,619 A | 1/2000 | Allard et al. | |
| 6,105,069 A | 8/2000 | Franklin et al. | |
| 7,188,170 B1 * | 3/2007 | Burnley et al. | 709/224 |
| 7,587,484 B1 * | 9/2009 | Smith et al. | 709/224 |
| 2002/0069172 A1 * | 6/2002 | Omshehe | G06F 17/30873 705/51 |
| 2002/0107809 A1 | 8/2002 | Biddle et al. | |
| 2002/0198883 A1 * | 12/2002 | Nishizawa et al. | 707/10 |
| 2003/0083998 A1 | 5/2003 | Ramachandran et al. | |
| 2004/0039916 A1 | 2/2004 | Aldis et al. | |
| 2004/0117380 A1 * | 6/2004 | Perrow | 707/100 |
| 2005/0243758 A1 | 11/2005 | Torarp et al. | |
| 2006/0080389 A1 | 4/2006 | Powers et al. | |
| 2007/0033395 A1 | 2/2007 | MacLean | |
| 2007/0083501 A1 * | 4/2007 | Pedersen | G06F 17/30067 |
| 2007/0083522 A1 * | 4/2007 | Nord | G06F 17/30067 |
| 2007/0133576 A1 * | 6/2007 | Tsuge | H04L 12/2856 370/401 |
| 2007/0156706 A1 | 7/2007 | Hayes | |

(Continued)

OTHER PUBLICATIONS

"What's New in Asset Intelligence for Configuration Manager", 2007, Microsoft Corporation, p. 1.

(Continued)

*Primary Examiner* — Irete F Ehichioya
*Assistant Examiner* — Johnese T Johnson
(74) *Attorney, Agent, or Firm* — Fiala & Weaver P.L.L.C.

(57) ABSTRACT

A client tracking mechanism has a log file analysis routine that may generate two tables, one having a licensable entity designator and last logged off time, and the other having a current session designator. The first table may be aggregated by a server that may collect data from multiple client tracking mechanisms to determine a licensable entity's sessions across multiple servers. The client tracking mechanism may save and resume analysis from the last analyzed log file entry, and may be able to track sessions that are both shorter and longer than the time between each analysis. In many embodiments, a licensable entity may be a user or a device, when a license arrangement is configured in a per-user or per-device basis.

20 Claims, 4 Drawing Sheets

(56) References Cited

U.S. PATENT DOCUMENTS

2008/0219445 A1* 9/2008 Yato et al. .................... 380/255
2008/0276179 A1* 11/2008 Borenstein et al. .......... 715/736
2009/0287846 A1* 11/2009 Iyengar ................ G06F 15/173
 709/242

OTHER PUBLICATIONS

"About Enabling Asset Intelligence Data Collection", 2007, Microsoft Corporation, pp. 1-3.
"Terminal Services Per User Licensing Usage Tracking", 2007, pp. 1-6.
Robinson, "Tool Helps Prove Software License Compliance", Incisive Media Ltd., 2007, pp. 1 3.

* cited by examiner

CLIENT ACCESS LICENSE TRACKING MECHANISM

BACKGROUND

Many software products may be licensed on a per-user or per-device basis. In many such license arrangements, a user or device may obtain a license from a license server which may have multiple licenses to allocate to various users or devices. In environments with many users and devices, tracking the license usage may be difficult, especially in a dynamic environment such as a big company where devices are being reconfigured or users are being hired, transferred, or may leave the company.

SUMMARY

A client access tracking mechanism has a log file analysis routine that may generate two tables, one having a licensable entity designator and last logged off time, and the other having a current session designator. The first table may be aggregated by a server that may collect data from multiple client access tracking mechanisms to determine a licensable entity's sessions across multiple servers. The client access tracking mechanism may save and resume analysis from the last analyzed log file entry, and may be able to track sessions that are both shorter and longer than the time between each analysis. In many embodiments, a licensable entity may be a user or a device, such as when a license arrangement is configured in a per-user or per-device basis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
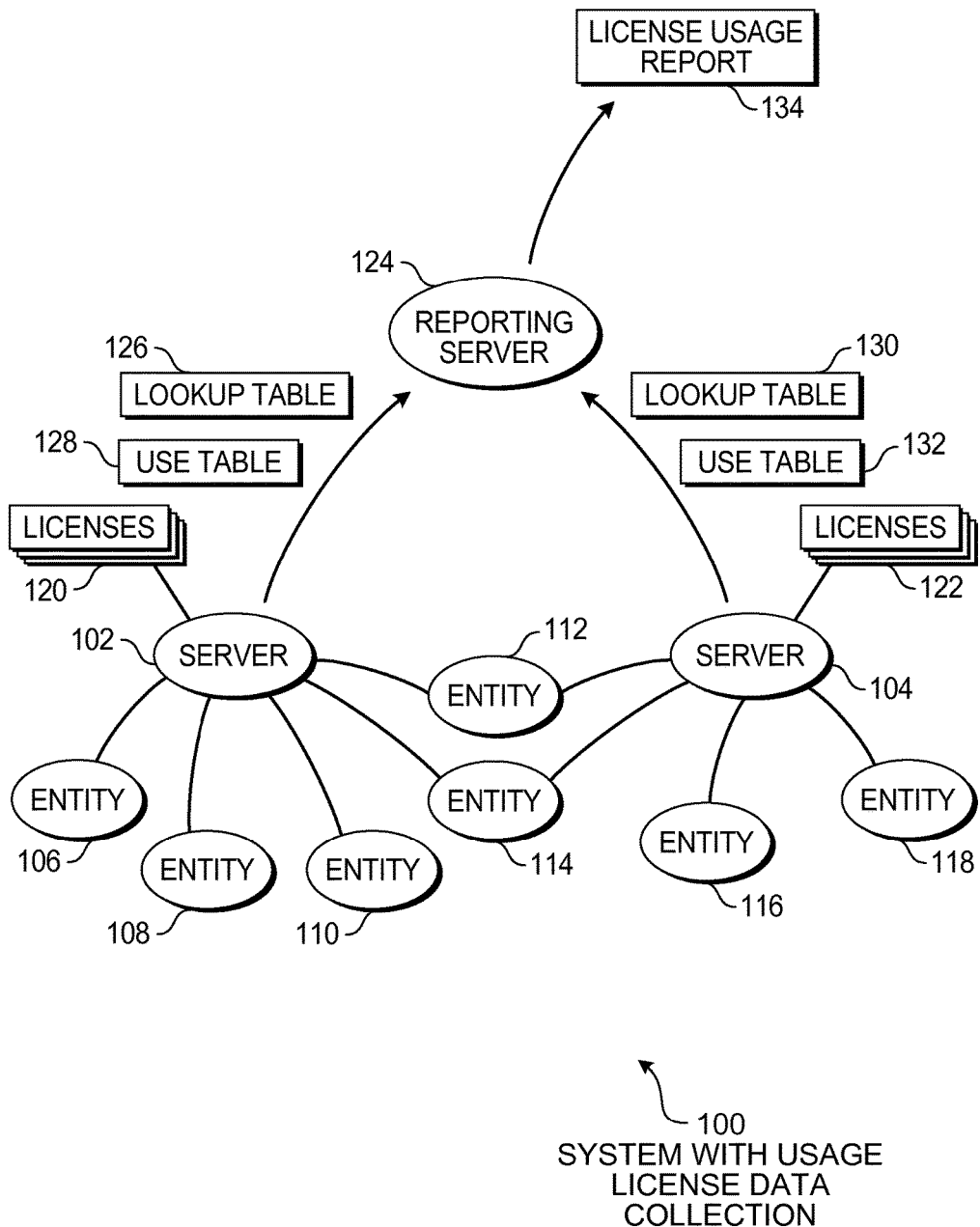
FIG. 1 is a diagram illustration of an embodiment showing a system with usage license data collection.

Many licensing mechanisms may use a pool of licenses that may be assigned to different licensable entities as the licensable entities connect to a server, use a specific function, or operate a hardware or software component. A licensable entity may be a user, device, or other entity.

Licenses may be created by a contract or agreement between a licensor, such as a software or hardware manufacturer or service provider, and a licensee. In many such agreements, a license may be made on a per-user or per-device basis. A software application, hardware component, or service may be purchased and used in accord with a license agreement. A licensee may purchase multiple licenses and have the licenses available for use, or may pay a license fee based on the usage over a period of time.

In many software applications, hardware devices, and services used within a corporation or enterprise, a license agreement may allow a license to be transferred from one licensable entity to another. For example, a per-user license arrangement may allow a license to be transferred from one user to another if the license is unused for a specified period of time. In some cases, a per-user license arrangement may enable a license to be transferred to another user when the first user logs off or otherwise relinquishes the license.

Large enterprises may have multiple servers and each server may have a pool of licenses from which per-user or per-device licenses may be issued. In some embodiments, each server may have a separate pool of licenses, while in other embodiments, multiple servers may use a common pool of licenses.

A license data collection mechanism may periodically analyze a log file to find actions that involve license sessions. Each ongoing session may be stored in a session table along with an identifier for a user, device, or other licensable entity. A use table may also be generated that includes each licensable entity and a time or date of a last use. If the entity has a current session, the use table may reflect a time or date of the analysis.

The use table may be analyzed to determine the number of uses of a license, and may be aggregated across multiple servers to determine an aggregated table that may contain all the licenses used across an enterprise or organization.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a system with usage license data collection. Embodiment 100 is an example of various functional elements that may be used in license usage collection.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates an example of a system where two servers 102 and 104 may interact with various entities. The entities may be users, devices, or other licensable entities that may connect with a server and consume a license.

A set of licenses may be used across different entities. In some cases, a license may be assigned to any device that accesses the licensed component on the server 102. For example, a licensed component may be a service, software application, or a hardware component that may be licensed. The licensed component may be available through any device or a subset of devices attached to a network, and an access license may be issued to the licensable entity when the entity connects to the server 102.

In some cases, an access license may be issued when an entity connects to a server, while in other cases, an access license may be issued when an entity specifically requests access to a licensed component.

A licensable entity may be defined by a license arrangement, and commonly used licensable entities are users and devices. When a user is a licensable entity, an access license enabling the user to use a licensed product may be allocated to the user. For example, if three different users access the licensed product, three access licenses may be allocated, even if the three users were using the same device to access the product. However, if the same user accesses the licensed product from two different devices, only one access license may be allocated.

A licensable entity may be a device in some embodiments. When a device is a licensable entity, an access license to a licensed product may be allocated to each device that is used to access the licensed product, no matter how many users may use the device. For example, a computer device that is used by many users may be allocated a single access license even though several users may use the device. However, when a user accesses the licensed product through two different devices, two access licenses may be allocated. Other embodiments may use different licensable entities.

The servers 102 and 104 may connect with many different entities at different times and may issue access licenses or allocate allocate licenses to each entity. In the embodiment 100, entities 106, 108, and 110 may connect to the server 102 and use access licenses. Entities 112 and 114 may connect to both servers 102 and 104 and may use either one or two access licenses, depending on the licensing arrangement. Entities 116 and 118 may connect to the server 104.

The servers 102 and 104 may have a set of predefined access licenses 120 and 122, respectively. In some embodiments, the access licenses 120 and 122 may be assigned to a specific server and allocated by that server. The access licenses 120 and 122 may be purchased ahead of time and stored on the server 102 or 104 for allocation. An administrator may or may not be able to move access licenses from one server to another. Some embodiments may have a set of access licenses that may be shared by two or more servers. In such an embodiment, a single server may be configured to allocate access licenses to other servers.

Throughout this specification, the term license may refer to any type of license that may be issued for a product. In some embodiments, a license may be an access license, where a manufacturer may grant only access to the licensed product. In other embodiments, a license may be issued to install, copy, modify, or perform other actions with the licensed product. For example purposes, references to an access license may be illustrated in this specification, but references to 'license' or 'access license' may also refer to any other licensing arrangement for which a license may be issued on a per-entity basis.

When a licensable entity requests a license, a server may issue a license by transferring license keys or some other mechanism to a licensable entity. In other embodiments, a server may track the usage of the licenses without transferring keys or other information to the licensable entities.

A licensed component may be any type of software, hardware, or service component. For example, an operating system or operating system component may be licensed to each of the various entities. In another example, a software application or suite of applications may be licensed. In some cases, a hardware component such as a search appliance, data storage device, network access point, or other component may be licensed. A licensed service may be a running application or service that may be accessed through a server 102 or 104. In some cases, the licensed service may be an executing application on one of the servers 102 or 104. In some cases, the licensed service may be accessed through the servers 102 or 104 and may be provided on a remotely connected server.

Many different arrangements of hardware, software, and services may be configured for licensing. Each licensed product may have a specific mechanism for identifying a licensable use of the product and storing such a use in a log file or other use archive. For example, a network appliance may have a set of registered users for the appliance, and licenses may be allocated when a registered user accesses the appliance, logs into the appliance, and is authenticated by the appliance. In other cases, a user may access a service across a network and the user's identification or device's network address may be used to passively determine the entity identification and register a use of the service.

In many embodiments, a license arrangement may allocate a license for an entity for a period of time. For example, a license arrangement may issue a license to a user or device that may not be transferred to another user or device for 24 hours, a week, month, quarter, or some other time frame. In some embodiments, a license may be returned to a license pool and may be allocated to a different entity immediately.

The servers 102 and 104 may collect license usage data into use tables 128 and 132 and transfer the use tables 128 and 132 along with lookup tables 126 and 130 to an aggregation server 124. The use tables 128 and 132 may contain entries having a designator for the licensable entity and the time the entity last used a license. The lookup tables 126 and 130 may contain designators for the entities and may be used by the reporting server 124 for generating a license usage report 134.

The reporting server 124 may aggregate the license usage from two or more servers to determine license usage over a company or enterprise. In many cases, a licensable entity may access a licensed product from two or more servers and may consume two or more licenses in the process. In some embodiments, several levels of reporting servers may be arranged in a hierarchical fashion to collect and aggregate many levels of servers.

The license usage report 134 may be used by an administrator or manager to analyze the actual license usage of entities within an organization. In some cases, licenses may be purchased but may be unused, and a manager or administrator may return unused licenses for credit, allocate licenses to different servers, or perform other functions based on the report 134.

In some cases, a license arrangement may be configured so that a payment may be made based on the actual licenses used. In such a case, the license usage report 134 may be used to create an invoice or charge an account.

Figure 2:
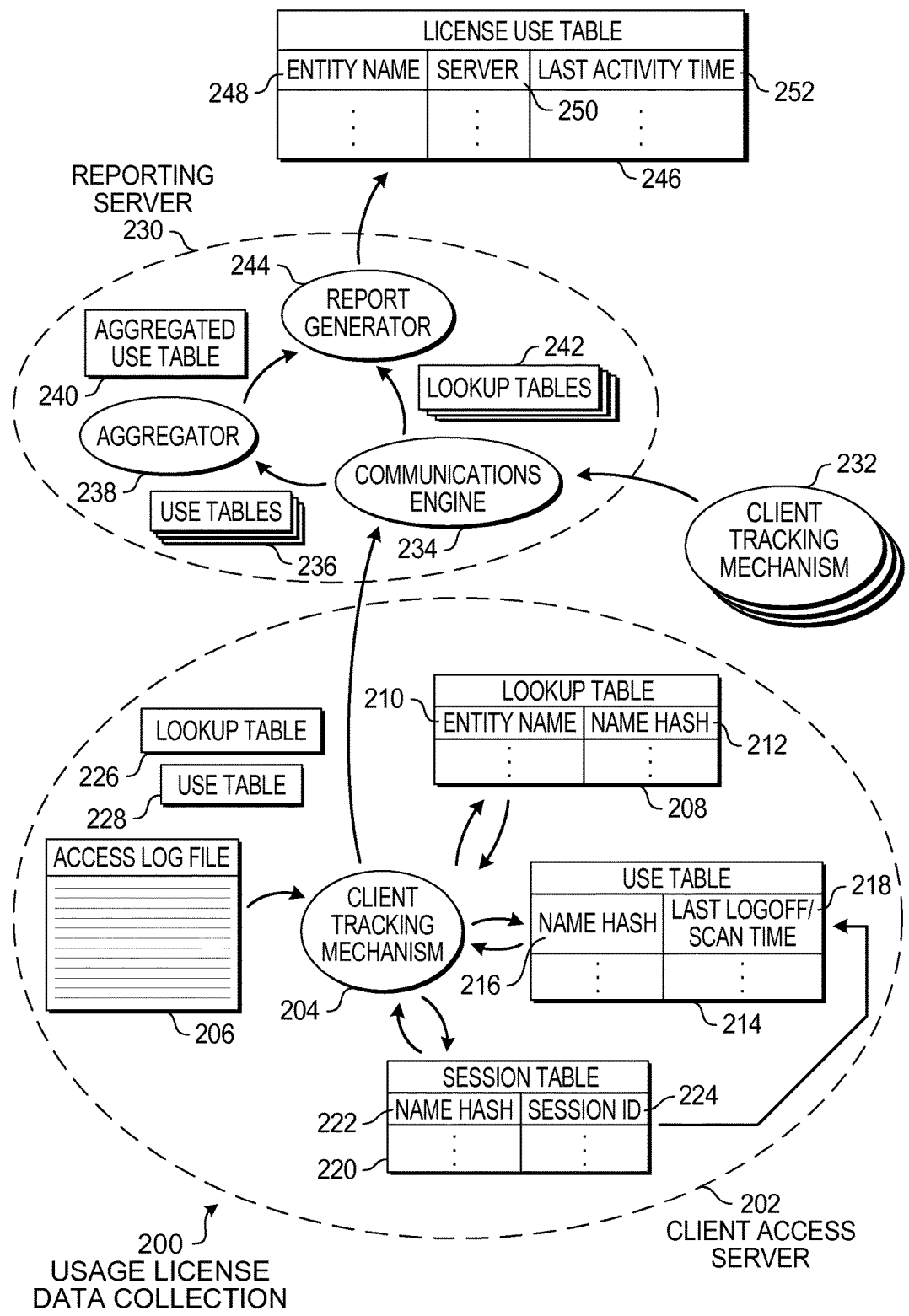
FIG. 2 is a diagram illustration of an embodiment showing the functional elements of a usage data collection system.

FIG. 2 is a diagram illustration of an embodiment 200 showing a usage data collection mechanism. Embodiment 200 is a simplified example of a mechanism that may be used to analyze a log file to determine the uses of a licensed product.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a mechanism for determining the uses of a licensed product may creating a use table that may contain the recent and current uses of a licensed product over a period of time. Embodiment 200 may also maintain a session table that may be used to track usage of a licensed product that may span the interval between analyses. The tables may be aggregated with tables from other servers to determine an overall usage table for an enterprise.

A client access server 202 may be a device that distributes licenses to licensable entities. The client access server 202 may contain a client tracking mechanism 204 that may read and analyze an access log file 206 to determine license usage. The client tracking mechanism 204 may be an application or process that may be performed on a periodic basis, such as once a week, once a month, or some other periodic interval. In some cases, the periodic interval may be much shorter or much longer, depending on the specific embodiment.

In many embodiments the device that operates the client tracking mechanism 204 may be the same server that allocates licenses. In other embodiments, a different device may analyze an access log file 206 than the server that may have issued licenses.

The client tracking mechanism 204 may read an access log file 206 to determine license usage. In some embodiments, the client tracking mechanism 204 may be used to audit or verify that licenses were correctly assigned by other mechanisms, while in other embodiments, the client tracking mechanism 204 may be the mechanism used by a licensor to monitor allocate licenses.

The access log file 206 may be created by logging various actions on a client license server. In some cases, the log entries may be actions created by a license distribution mechanism. In such a case, a license management system may create various log entries to track license usage. In other cases, the log entries may be a general purpose log. In such a case, a log may contain many superfluous entries that may not relate to license usage.

The client tracking mechanism 204 may analyze the access log file 206 and determine that a user, device, or other licensable entity has accessed a license, has been allocated a license, or has performed an action that may invoke a license. A lookup table 208 may be used to correlate a full length licensable entity identifier with a shorthand notation for the entity.

The client tracking mechanism 204 may create an entry in a lookup table 208 that may contain the entity name 210 and a hash 212 of the entity name. In many embodiments, a user name, device designator, or other identifier of a licensable entity may be quite long and unwieldy.

In many embodiments, the shorthand notation for an entity name may be a hash, such as an MD5 hash. By using a hash of an entity name, two servers that may encounter the same entity name may be able to separately create the same shorthand notation for the entity name.

Some embodiments may not use a lookup table 208 and may instead use an entity identifier in place of a hash.

The client tracking mechanism 204 may create and maintain a use table 214 that may contain the name hash 216 and a last logoff or scan time 218. Each entity may have at least one row within the use table 214.

The client tracking mechanism 204 may create and maintain a session table 220. The session table 220 may contain rows with a name hash 222 and a session identifier 224 for each currently active session. The session table 220 may be used to capture an ongoing session that may be longer than the period between analyses.

The session table 220 may store a session identification 224 that may be a unique identification for the session. In many embodiments, a locally unique identification ('LUID') may be used. Other embodiments may use a globally unique identification ('GUID') for the session identification.

The use table 214 may contain a name hash 216 and the last entity logoff time or the last scan time 218. If a logoff action is found in the access log file 206, the logoff time may be entered into the use table 214. If the entity is logged in when an analysis is performed, the entry in the use table 214 may be updated to reflect the time the analysis is performed. An entry in the session table 220 may be used to indicate when an entity has an ongoing session. Sessions may carry over from one analysis session to another, and may cause entries in the use table 214 to be updated to reflect the time an analysis is performed.

For example, a user may log into a server and the server may allocate a license to the user. At the time the user logs in, an entry is created in the access log file 206 indicating that the user logs in. In this example, the user may stay logged in for a month before logging out.

In the example, the client tracking mechanism 204 may perform an analysis on a weekly basis. The first time the client tracking mechanism 204 is run after the user logged in, an entry may be created in the use table 214 with the user's name hash 216 and with an entry showing the scan time 218. The user's name hash 222 and a session identifier 224 may also be used to create an entry in the session table 220.

Continuing with the example, the scan may be performed a week later, and there may be no new or unprocessed entries in the access log file. However, the presence of an entry in the session table 220 may cause the use table entry 214 corresponding to the entity to be updated to reflect the current analysis time.

In between analyses, the lookup table 208, use table 214, and session table 220 may be stored locally and recalled with the next analysis. In many cases, a pointer to a location within the access log file 206 may also be stored.

After an analysis is performed, an updated lookup table 226 and use table 228 may be transferred to a reporting server 230. The reporting server 230 may collect lookup tables and use tables from many other client tracking mechanisms 232.

The reporting server 230 may consolidate or aggregate use tables from several different servers to create a license use table 246. The license use table 246 may consolidate the license uses across multiple servers, which may represent the usage over an entire organization.

The reporting server 230 may have a communications engine 234 that may receive lookup tables and use tables. In some embodiments, the communications engine 234 may initiate the actions of a client tracking mechanism 204 may issuing a command to start the client tracking mechanism 204. The communications engine 234 may request that the lookup table 226 and use table 228 be transferred to the reporting server 230.

In other embodiments, the communications engine 234 may be passive and may receive messages containing the lookup table 226 and use table 228. In some embodiments, such messages may be received at predetermined intervals, while in other embodiments, such messages may be received at random times.

The communications engine 234 may pass multiple use tables 236 to an aggregator 238. The aggregator 238 may create an aggregated use table 240 that may include entries from many different servers. The aggregated use table 240 may include a server identification for each entry.

The report generator 244 may generate the license use table 246 using the aggregated use table 240 and the lookup tables 242.

The license use table 246 may include a full entity name 248, a server identification 250, and a last activity time 252. The license use table 246 may be used to calculate license fees for licenses used across an enterprise, analyze license usage across the enterprise, or for other purposes.

Figure 3:
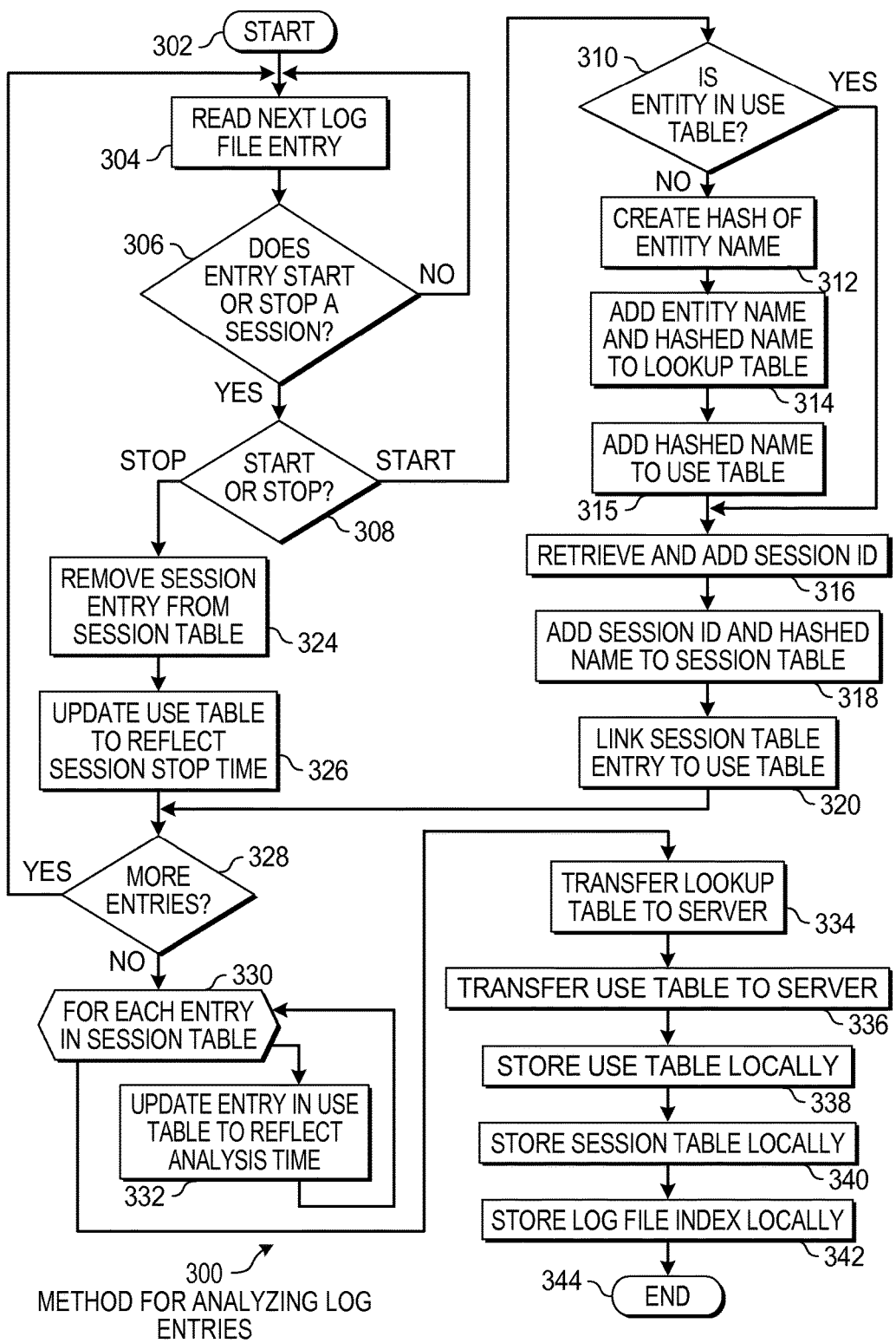
FIG. 3 is a flowchart illustration of an embodiment showing a method for analyzing log file entries.

FIG. 3 is a flowchart illustration of an embodiment 300 showing a method for analyzing log entries. Embodiment 300 is an example of a method that may be performed by a client tracking mechanism, such as the client tracking mechanism 204.

Embodiment 300 is merely one example of such a method. Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 processes entries in a log file and may process the entry into a look up file, a session file, and a use file. After analyzing the log file, the various files are transferred to a reporting server and stored for the next analysis session.

The process begins in block 302.

A log file entry is read in block 304. When performing an analysis after a previous analysis, a bookmark or other indicator may be used to flag a starting entry in the log file. When a bookmark is used, the analysis may proceed where the previous analysis left off.

The log file may be any type of log file that may contain references to licensable entities accessing licensed products. In some cases, the log file may be a generic sever log file that may include many different entries, some of which may not pertain to a license.

If the log file entry does not stop or start a session with a licensed product in block 306, the process returns to block 304 to analyze the next log entry.

If the log file entry does start or stop a session with a licensed product in block 306, and the log file entry starts a session in block 308, the process moves to block 310.

In block 310, if the licensable entity does not already have an entry in a use table in block 310, a hash of the entity name may be created in block 312 and the hashed name and the full name of the entity may be added to a lookup table in block 314. The hashed name may be added to the use table in block 315. If the licensable entity does have an entry in the use table in block 310, the process may jump to block 316.

In many embodiments, a lookup table may be used to create an identifier that may be used as a shorthand notation for the entity name in the use table and session table.

A session identifier may be created in block 316. In many embodiments, a session identification may be a unique identifier, such as a locally unique identifier ('LUID') or a globally unique identifier ('GUID'). When such a unique identifier is used, duplicate entries in a session table may be avoided.

The session identification and hashed name may be added to the session table in block 318, and the session table entry may be linked to the use table in block 320. In many embodiments, entries in the session table may have a many-to-one relationship with entries in the use table. In such embodiments, the use table and session table may be organized and manipulated with various relational database mechanisms.

If the log file entry in block 308 relates to stopping a session, the session may be removed from the session table in block 324 and the use table may be updated to reflect the session stop time in block 326.

If more log file entries are to be analyzed in block 328, the process returns to block 304 for the next log file entry.

If no more log file entries are to be analyzed in block 328, for each entry in block 330, the use table entry with the corresponding hashed name may be updated to reflect the analysis time in block 332. This step may update the use table to indicate that a licensable entity was last known to be using a license at the time the analysis was performed. Some embodiments may use such a designator because the use file may be aggregated, analyzed, or otherwise processed a good deal of time later than the time the log file was analyzed.

The lookup table may be transferred to a reporting server in block 334 as well as the use table in block 336. The lookup table and use table may be used for calculating the license usage, generating reports, and other functions.

The use table may be stored locally in block 338, as well as the session file in block 340. An index for the log file may also be stored locally in block 342.

The locally stored versions of the tables and index may be stored in any manner, using any type of storage technology. In some cases, the use table and the session table may be converted to XML and stored as an XML file. Other embodiments may use other mechanisms for storing the data.

The process of embodiment 300 may end in block 344. The process of embodiment 300 may be resumed by loading the use table, the session table, and the log file index and resuming in block 304.

Figure 4:
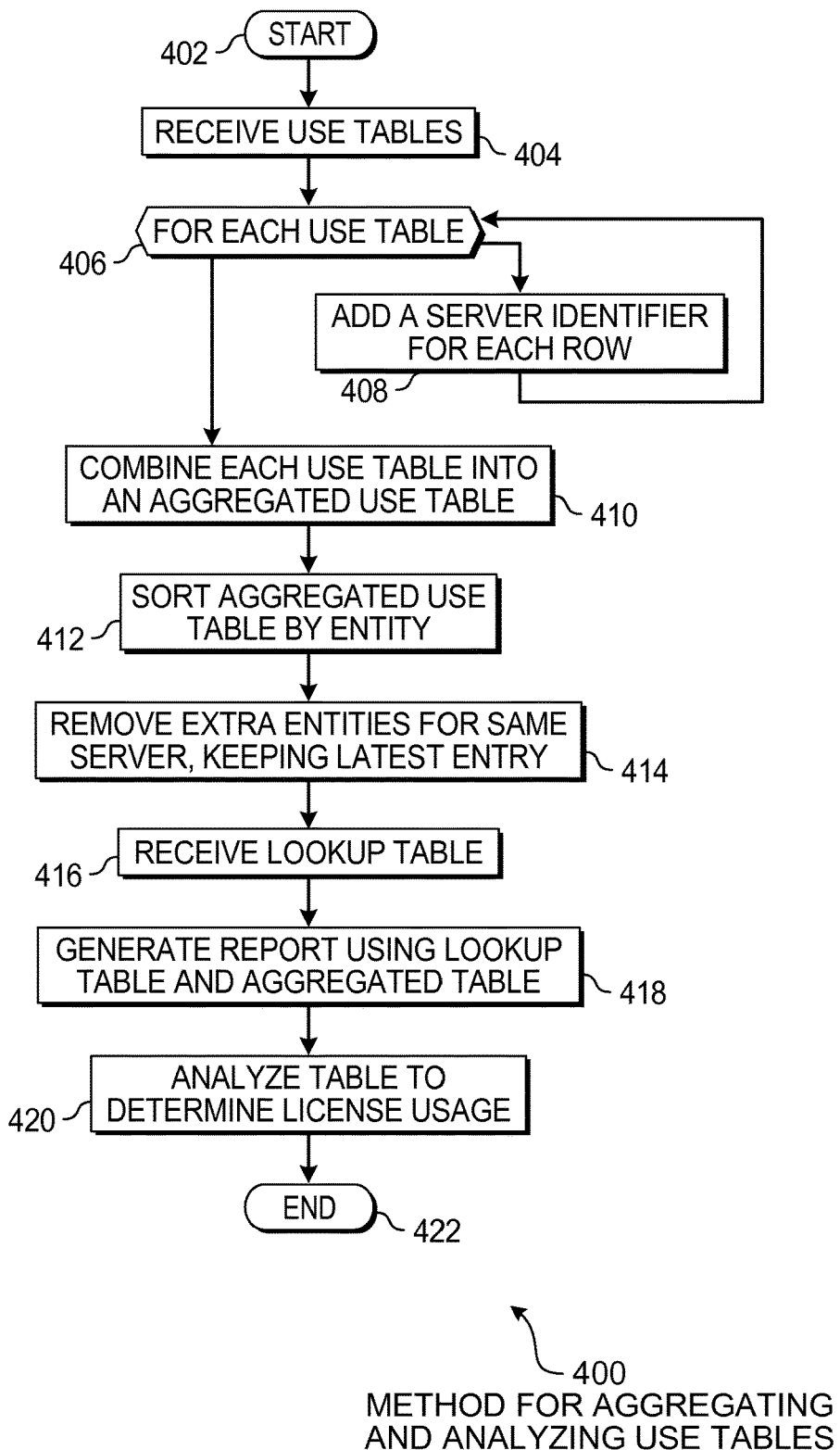
FIG. 4 is a flowchart illustration of an embodiment showing a method for aggregating and reporting multiple use tables.

FIG. 4 is a flowchart illustration of an embodiment 400 showing a method for aggregating and analyzing use tables. Embodiment 400 may illustrate one simplified method performed by a reporting server, such as reporting server 124 or 230.

Embodiment 400 is merely one example of such a method. Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a simplified method for aggregating use tables and generating a report using the use tables and lookup tables.

The process may start in block 402.

Multiple use tables may be received in block 404. Each embodiment may use different techniques and mechanisms for transporting use tables from a client tracking mechanism to a reporting server. In some cases, the use tables may be received through various messaging systems. In other cases, the use tables may be received by reading various files in a specific directory in a file system. Other embodiments may have different mechanisms for delivering use tables and lookup tables to a reporting server.

For each use table in block 406, a server identifier may be added to each row or entry in block 408. The server identifier may be used to differentiate license usage by one licensing entity on two or more different servers.

Each use table may be combined in block 410 into an aggregated use table. The aggregated use table may contain entries that contain a hashed name, a server identification, and a last known access time. In some cases, such as where a session is ongoing between a licensable entity and a server, the last known access time may be the time that an analysis operation such as embodiment 300 was performed.

The aggregated use table may be sorted by entity in block 412. The sorting may aid in removing any extra entries for the same server and same hashed name in block 414. When two or more entries are found in block 414 that have the same hashed name and same server identification, the entry with the latest time or date stamp may be kept.

The lookup table may be received in block 416. The lookup table may include an index between a hashed name and a full name of a licensable entity.

The lookup table may be used to generate a report with the aggregated use table in block 418. The report may have the hashed names of the use table replaced with the full names found in the lookup table.

The aggregated use table may be analyzed in block 420 to determine license usage. The process may end in block 422.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
performing an analysis session of a log file at a predetermined time interval, comprising:
analyzing a plurality of entries in the log file, each entry of said plurality of entries corresponding to an action by a licensable entity;
determining that a first entry of said plurality of entries is indicative of said licensing entity initiating a licensable session;
in response to determining that said first entry is indicative of said licensing entity initiating a licensable session, storing a session entry comprising a session designator for said licensable session and an entity designator for said licensable entity in an entry in a session table;
determining that a second entry of said plurality of entries is indicative of said licensing entity ending said licensable session at an ending time;
in response to determining that said second entry is indicative of said licensing entity ending said licensable session at said ending time, storing said entity designator and said ending time in a use table, and removing said session entry comprising said session designator from said session table;
for each of said entry in said session table, updating said use table to reflect a completion time of said analysis session; and
storing said use table and said session table.

2. The method of claim 1, said analysis session further comprising:
storing an index for said log file, said index indicating a last log file entry analyzed.

3. The method of claim 2, said method comprising:
performing a second analysis session comprising:
recalling said index;
reading said log file beginning after said index; and
recalling said use table and said session table.

4. The method of claim 1, said licensable entity being a device.

5. The method of claim 1, said licensable entity being a user.

6. The method of claim 1, said entity designator being a hash of a licensable entity identification name.

7. The method of claim 1, said session designator comprising a unique identifier for said session.

8. The method of claim 7, said unique identifier being a locally unique identifier.

9. A system, said system comprising:
a computer hardware device; and
at least one memory that stores one or more programs, including a client tracking mechanism configured to, at a predefined interval:
 analyze a plurality of entries of a log file, each entry of said plurality of entries corresponding to an action by a licensable entity;
 determine that a first entry of said plurality of entries of said log file is indicative of a first licensing entity initiating a first licensable session;
 in response to determining that said first entry is indicative of said first licensing entity initiating said first licensable session, store a first session entry comprising a first session designator for said first licensable session and a first entity designator for said first licensable entity in a session table comprising session entries comprising a session identifier and an entity designator;
 determine that a second entry of said plurality of entries of said log file is indicative of a second licensing entity ending a second licensable session at an ending time;
 in response to determining that said second entry is indicative of said second licensing entity ending said second licensable session at said ending time, identify a second session entry in said session table corresponding to said second licensable session, said second session entry comprising a second session designator, storing a second entity designator, said second session designator, and said ending time in a use table comprising use entries that comprise an entity designator and a corresponding last known login time, and removing said second session entry from said session table;
 for each of said entries in said session table, update said use table to reflect a completion time by said client tracking mechanism; and
 storing said use table and said session table.

10. The system of claim 9, said licensable entity being a device.

11. The system of claim 9, said licensable entity being a user.

12. The system of claim 9, said entity designator being a hash of a licensable entity identification name.

13. The system of claim 9, said session designator comprising a unique identifier for said session.

14. The system of claim 13, said unique identifier being a locally unique identifier.

15. A system being a computer hardware device, said system comprising:
at least one memory;
a communications engine configured to receive a plurality of use tables, each of said use tables comprising a plurality of entries, each entry comprising an identifier for a respective licensable entity and a time value, each of said use tables being received from a server having a respective server identification, at least one of the respective time values comprising a last scan time of an analysis session of a log file comprising a plurality of entries, each entry of said plurality of entries of the log file corresponding to an action by a respective licensable entity;
an aggregator, at least partially implemented in the at least one memory, configured to create an aggregated table comprising a plurality of entries, each entry comprising said identifier for said respective licensable entity, said respective server identification, and said time value, an entry of the plurality of entries of the aggregated table being removed in response to a determination that said entry of the plurality of entries includes a duplicate server identification; and
a report generator, at least partially implemented in the at least one memory, configured to create at least one report from said aggregated table.

16. The system of claim 15, said communications engine further configured to receive a licensable entity translation table comprising entries comprising an identifier for said licensable entity and an entity name for said licensable entity.

17. The system of claim 16, said identifier for said licensable entity comprising a hash of said entity name.

18. The system of claim 15, said licensable entity being a user.

19. The system of claim 15, said licensable entity being a device.

20. The system of claim 15, wherein at least another one of the respective time values comprises a last log off time for said licensable entity.

* * * * *